United States Patent

[11] 3,537,386

[72] Inventor Gregory Grosbard
 Long Beach, New York
[21] Appl. No. 773,118
[22] Filed Nov. 4, 1968
[45] Patented Nov. 3, 1970
[73] Assignee International Research Development, Inc.
 Salt Lake City, Utah

[54] APPARATUS FOR MIXING, PREPARING AND EXTRUDING VISCOUS MATERIAL
 14 Claims, 7 Drawing Figs.

[52] U.S. Cl. .................................................. 99/353
[51] Int. Cl. .................................................. A23 5/00
[50] Field of Search .......................................... 99/349,
 352, 353, 354, 355; 259/7, 8

[56] References Cited
 UNITED STATES PATENTS
 3,215,062 11/1965 Frankenberg ................ 99/353
 3,374,728 3/1968 Owens ......................... 99/353
 3,385,204 5/1968 Richardson .................. 99/353
 3,397,868 8/1968 Schlernitzauer ............. 259/8

Primary Examiner—Robert W. Jenkins
Attorney—Jacobs and Jacobs

ABSTRACT: The raw materials, particularly food products, from separate storage containers, are fed in from the top into respective ones of a plurality of flow tubes, for example, cylindrical and concentric, through which the materials flow downwardly by gravity and are discharged onto a receiver at the bottom in solidified or semisolidified form. The viscosities of the respective materials are increased in the forming tubes, depending upon the types of materials (such as liquid eggs, gelatins, chocolate, caramel, ice cream) by heating elements or cooling elements, or both, surrounding respective portions of the lengths of the respective flow tubes. Vibrator means assist the downward flow. Metering pumps control the flow quantities, and a horizontally reciprocable cutoff mechanism at the bottom of the tubes severs the unitary single or plural formed product from the rest of the solidifying material above within the tubes.

INVENTOR
GREGORY GROSBARD
BY Jacobs & Jacobs
ATTORNEY

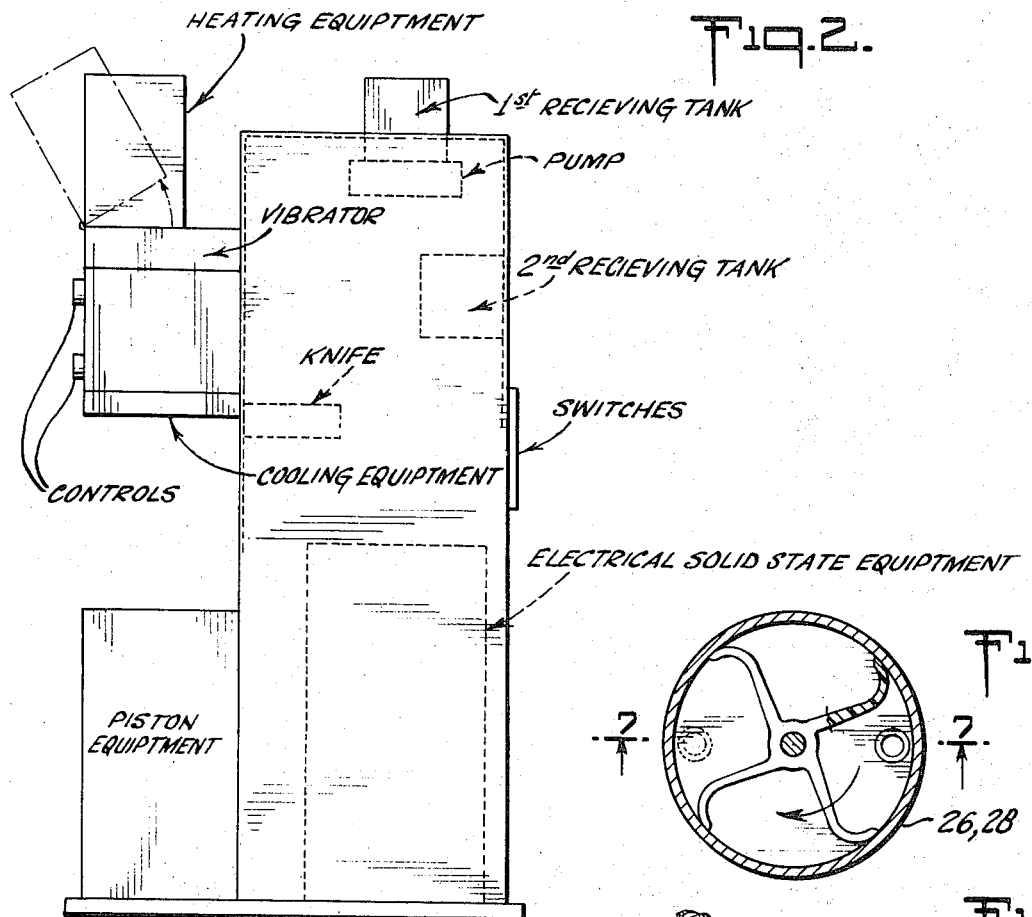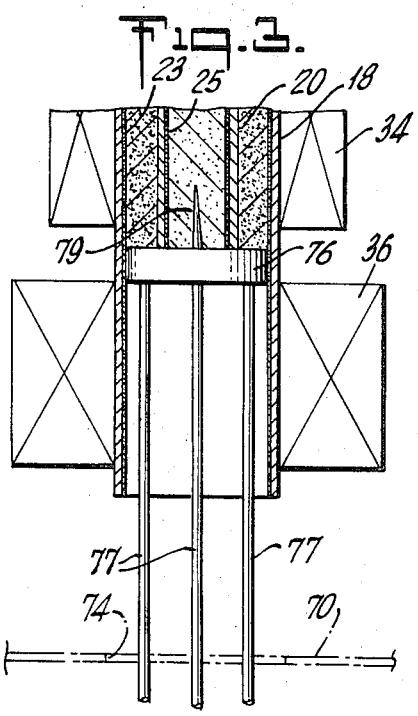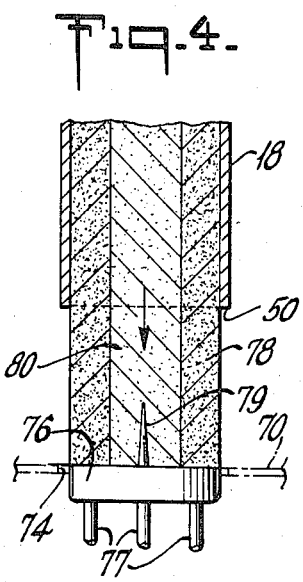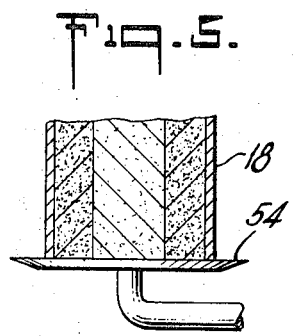

3,537,386

APPARATUS FOR MIXING, PREPARING AND EXTRUDING VISCOUS MATERIAL

SUMMARY OF THE INVENTION

This invention relates to apparatus for mixing, preparing and extruding viscous materials, particularly viscous food material or any powder mixed with any liquid to form a viscous food material, including those having characteristics of not flowing easily, but having the capability of being processed to a permanent solid state by the application of heat and/or cold. Examples of such food products are different combinations of gelatins, crystal candy forms, caramels, chocolates, instant mashed potatoes, etc., and particularly broken liquid raw eggs in different states, such as separated and homogenized yolks and whites, blended and homogenized yolks and whites in different proportions of solids with or without additives, may be used. The apparatus is capable of rapidly dispensing puddings, mashed potatoes, ice cream and cake combinations and, also, other viscous materials.

There is currently a need for finding a use for broken, separated and homogenized eggs available now in so-called egg-breaking plants where pullet eggs, broken eggs and surplus eggs are separated, blended, homogenized and processed to powdered egg form, and sold to the baking and restaurant industry. The apparatus of this invention can make use of such raw materials. The apparatus can produce a "AA" grade cooked egg in an elongated form without thick white ends in a homogenized form which will keep for 12 days without refrigeration.

The externally sausage-shaped egg product so produced by the apparatus can be packaged in clear plastic as ready to slice, or it can be sliced and shipped in pint or quart containers, or as chopped eggs for the housewife to buy out of a dairy case in a local supermarket, and also frozen to keep indefinitely, whatever the need. The product can be packaged in vacuum cans for long storage, for the general market, and particularly for Army rations. It can also be packaged in large, reusable cans with plastic bag liners for restaurants, caterers, hospitals, institutions, schools, resorts and hotels in cooked, chopped or cooked, sliced form for their dietary use.

By varying the shapes of the tubes, the food product can also be packaged and extruded as a "deviled egg," colored Easter eggs in a variety of shapes, and marketed accordingly.

The apparatus itself, provided with a plurality, e.g., three different extruding tubes at different temperature settings, can dispense an immediate and continuous "scrambled egg" controlled by temperature adjustment, to the taste of the consumer, i.e., loose, medium or hard. The apparatus may be installed where large quantities of people are to be served during short periods of time, as in school cafeterias, prisons, Army, Navy and Air Force mess halls, hospitals and institutions, and the like.

The invention will now be described in detail with reference to the accompanying drawings.

In the drawings:

FIG. 2 is a generally schematic side view of the apparatus, showing the relative arrangement of the various components of the apparatus;

FIG. 3 is a vertical cross section of a detail of the device of FIG. 1, illustrating the startup-retaining plunger in position against the bottom of the inner forming tube;

FIG. 4 is a partial view of the lower portion of the apparatus of FIG. 3, showing the startup-retaining plunger in lowered position;

FIG. 5 is a vertical cross section of a detail of the apparatus showing the cutoff knife which reciprocates horizontally across the bottom opening of the outer forming tube;

FIG. 6 is a plan view of one of the metering pumps of the device, taken along the plane of line 6–6 of FIG. 7, and FIG. 7 is a vertical cross section of the metering pump of FIG. 6, taken along the line 7–7 of FIG. 6.

Figure 1:
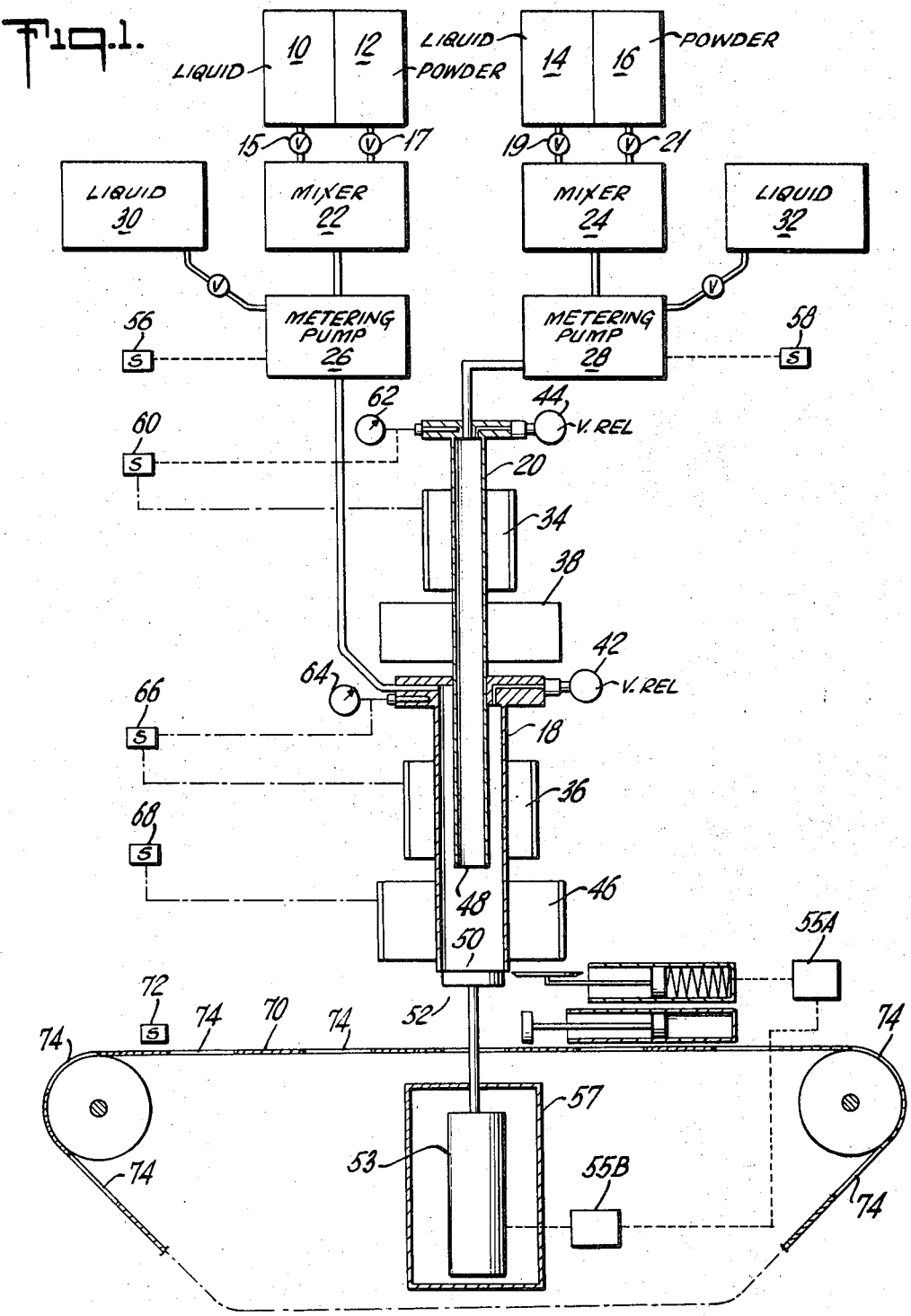
FIG. 1 represents a vertical cross section of the apparatus of the invention with certain portions shown schematically.

In the drawing, as shown in FIG. 1, containers 10 and 12 provide the supply of liquid and/or powdered raw material by gravity flow through valves 15, 17 to an outer forming tube 18, while containers 14 and 16 provide the raw materials in a similar manner to the inner forming tube 20 through valves 19, 21. Of course, there can be a single supply container or a plurality, depending upon the desired end product. The raw material batches flow into mixers 22, 24, respectively. There can be more than two mixers, as required, especially if there are more than two groups of initial supply containers. From the mixers 22, 24 the material flows to one or more slow metering pumps 26, 28, according to the number of containers from where it enters into the metal conduits or forming tubes 18, 20, which are preferably coated on their inner surface with Teflon to help minimize friction. Of course, a multiplicity of concentric or adjacent Teflon-coated metal conduits such as 18, 20 are provided (depending upon the number of liquids charged into the tubes from the metering pumps). Additional liquid, such as water or milk, is added at the metering pumps 26, 28 in a controlled manner from tanks 30, 32, respectively.

Surrounding each of the Teflon-coated metal conduits 18, 20 are electrical heating elements 34, 36 each individually controlled for temperature, depending upon the consistency or characteristics of the liquid or viscous material passing downwardly through the respective forming conduits 18 and 20. Further down along the forming conduits 18, 20 are located vibrators 38, beneath the respective electric heating elements 34, 36. The vibrators serve to aid the downward flow of the already solidified or solidifying material passing downwardly through the forming conduits 18, 20. Pressure-relief valves 42, 44 serve to control the pressure in the forming tubes 18, 20.

The downwardly flowing material in the tubes 18, 20 gradually becomes more and more viscous when exposed to the heat of heating elements 34, 36, in specific cases, such as eggs, or when the material is ice cream and is exposed to cooling by refrigeration equipment 46. When necessary, an additional vibrator may be located beneath the second heating element 36, or the refrigeration element 46, in order to aid the flow of material from inner tube 20 into the already partially-solidified material in the outer tube 18.

As the solidified material reaches the bottom end 48 of the inner tube 20, it is already solidified and forms the inner core of the material flowing downwardly through the outer tube 18. As the combined inner and outer materials reach the bottom end 50 of the outer tube, and before they emerge, a piston or sustaining plunger 52, movable during normal operation into the position as shown in FIG. 1 at the bottom end 50 of the outer tube, receives and supports the issuing length of material during the subsequent crosscutting action of a knife 54, which reciprocates from the side. The vertically moving piston 52 is preferably of aluminum or stainless steel, for ease of cleaning, as is the horizontally reciprocating knife 54. Various electrical control switches, including switches 56, 58, which control the respective pumps 26, 28, are connected so that the motors for mixers 22, 24, the metering pumps 26, 28, which force the material downwardly, as well as the vibrators 38, are all shut off periodically during the action of the cutter 54 passing across the bottom 50 of the tube 20, so that during the period that the cutting action takes place, the flowing viscous material in the forming tubes 18, 20, is at an instantaneous standstill.

The heating elements 34, 36, are thermostatically controlled by adjustable thermostats 62, 64, which operate switches 60, 66, respectively. The rapid-cool refrigerating device 46 is similarly controlled through a thermostatic switch 68. A conveyor belt 70 is controlled from a switch 72.

As the cutter 54 makes its cutting operation, the periodic start-stop moving belt 70 receives the already solidified material for transporting it toward the left as seen in FIG. 1. The belt 70 is provided with spaced holes 74, synchronized with up and down movement of the piston 52 so that the belt moves ahead only when the piston 52 is in lowered position (not shown) beneath the level of belt 70. When the piston 52 is below the level of the movable belt 70, the belt 70 progresses one step further to the next opening 74, through which the piston 52 again moves upwardly therethrough. A timing mechanism, or a contact mechanism carried on the belt (not shown) synchronizes the up and down movement of the piston 52 with the openings 74 in the conveyor belt 70.

FIG. 3 illustrates, in vertical cross section, the operation of initiating the process. A startup-retaining plunger 76 is manually inserted to hold the liquid material at the level of the bottom of the inner tube, as well as in the outer tube at the same level, until the material in the inner and outer tubes begins to solidify sufficiently. The starting plunger 76 is then removed by hand, and the operation progresses continuously and becomes self-sustaining automatically. The initial material removed with plunger 76 is discarded until its consistency or viscosity has reached the desired value, and the operation then proceeds automatically. A plurality of vertically-arranged flexible wires 77, attached to the bottom of startup plunger 76, facilitates manual manipulation and levelling of the plunger 76 until the product 78 in the outer tube and the product 80 in the inner tube reach the respective desired viscosity or solidification point.

The above-mentioned inner Teflon coatings are designated in FIG. 3 at 23 on outer tube 18 and coating 25 on inner tube 20.

FIG. 4 shows a detail of the starting-up plunger in lowered position supporting the material now sufficiently solidified and issuing at 50. The outer solidified material 78, e.g., egg white, formed in outer tube 18, surrounds the inner core 80, e.g., of yolk, formed in tube 20. If desired, a spearhead 79 may be provided on plunger 76 or on piston 52 to help retain the end portion of formed product in place until it is transferred out of the forming tubes.

FIG. 5 illustrates the cutter above described, shown in the cutting position across the outer forming tube 18. In FIG. 1, the cutter is shown in position withdrawn to the extreme right.

To remove the cutoff portion or slice of solidified material from the piston 52 onto the belt 70, a transfer or pushoff mechanism may be provided, shown in FIG. 1 as a plunger which operates horizontally in synchronism with the vertically reciprocating piston. Depending upon the consistency of the material, if it is stiff enough, the horizontally moving belt 70, arranged on the same level as the bottom of the vertically reciprocating piston in lowered position, moves the cutoff cylinder of material horizontally with the belt as the latter moves at right angles to the vertical movement of piston 52, carrying with it the cylinder of solidified discharged and cutoff material. A piston-actuating mechanism 53, for example, a hydraulic cylinder, located within a housing 57, serves to move the piston 52 up and down in coordination with cutting movements of the knife 54, in the manner explained above, the synchronism being effectuated by means of interconnected knife and piston actuating switches 55A and 55B, respectively.

It will be obvious to one skilled in the art, upon reading the foregoing disclosure and studying the accompanying drawings, that a number of modifications and alterations are possible within the scope and spirit of the appended claims. For example, a single forming tube, rather than a plurality, may be used, and satisfactory "scrambled" eggs produced therefrom by heating the single forming tube, when the raw material charged at the top of the apparatus is broken raw eggs. Furthermore, the plurality of forming tubes need not necessarily be cylindrical or concentric. One tube or the other, for example, may be star-shaped or elliptical or centrally offset. Gelatin desserts may be produced with gelatin or candy cores of different colors, formed in the inner forming tube or tubes. Or ice cream and cake combinations can be produced by refrigerating the ice cream filler core with the refrigeration unit while baking the cake portion in the outer tube by the electrical heating element. These, and numerous other uses and applications for the disclosed apparatus are possible and will be apparent from this disclosure.

I claim:

1. Apparatus for solidifying, preparing and extruding in elongated shape at least one of a plurality of viscous materials, particularly foods, comprising feeding container means for storing raw materials, mixing means arranged to receive, mix and prepare the raw materials into respective homogeneous liquids, metering pump means arranged to receive the prepared and mixed materials from said mixing means and to discharge same at respective predetermined rates, tubular forming means arranged to receive said prepared and mixed materials at said predetermined rates from said metering pump means, means associated with said forming means for increasing the viscosity of the prepared material as said material flows downwardly within said tubular forming means, and discharge means for removing and transferring extruded portions of the material of increased viscosity from said forming means.

2. Apparatus according to claim 1, said tubular forming means comprising a plurality of tubes arranged for one to surround the other along at least a portion of their respective lengths.

3. Apparatus according to claim 1, said means for increasing the viscosity comprising heating means surrounding at least one of said tubular forming means along a portion of its length, and thermostatic temperature control means having temperature detecting means within said tubular forming means for switching said heating means on and off.

4. Apparatus according to claim 3, said electrical heating element means comprising at least one heating element surrounding said tube.

5. Apparatus according to claim 1, said means for increasing the viscosity comprising refrigeration means surrounding at least a portion of said tubular forming means along a part of the length of said forming means, and thermostatic temperature control means for switching said refrigeration means on and off in accordance with a desired solidifying temperature of material within said forming means.

6. Apparatus according to claim 1, said metering pump means having a source of liquid connected thereto, flow inlet means normally leading from said mixer means to said metering pump means, and flow outlet means normally leading from said metering pump means to said tubular forming means.

7. Apparatus according to claim 1, said tubular forming means being provided with an inner layer of friction-reducing material.

8. Apparatus according to claim 7, said friction-reducing material being Teflon.

9. Apparatus according to claim 7, said tubular forming means having said inner friction-reducing layer comprising a metallic material capable of relatively rapid heat transfer therethrough.

10. Apparatus according to claim 1, further including vibrator means closely associated with said tubular forming means to assist downward flow of material formed therein.

11. Apparatus according to claim 1, further including a startup plunger associated with and of a size insertable into and removable from the bottom end of said tubular forming means for temporarily supporting the material within said tubular forming means until said material has achieved a predetermined viscosity.

12. Apparatus according to claim 1, said discharge means comprising a vertically reciprocable piston having a product-receiving upper surface for receiving solidified material from said forming means, and transporting means arranged to receive the solidified product from said piston.

13. Apparatus according to claim 12, said discharge means further including a cutoff knife periodically movable in a plane at right angles to the longitudinal axis of said tubular forming means.

14. Apparatus according to claim 13, said cutoff knife having control means synchronizing horizontal movement of said knife with vertical movement of said piston and with movement of said transporting means.